Oct. 10, 1933.  A. J. RUPPERT  1,930,396
VACUUM WASHER
Filed Oct. 29, 1931
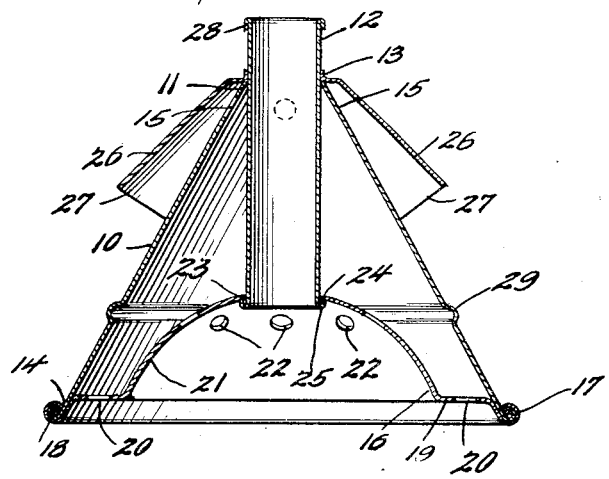
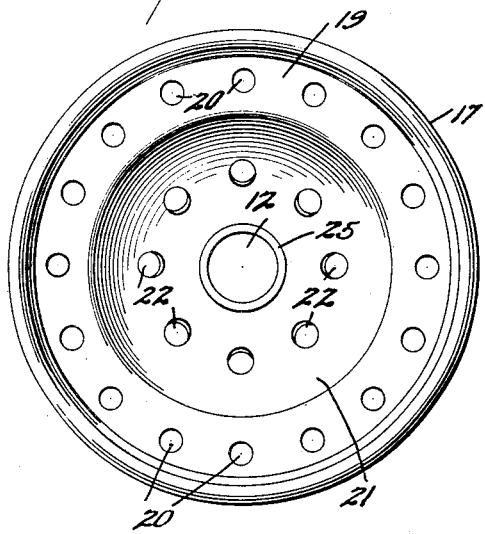
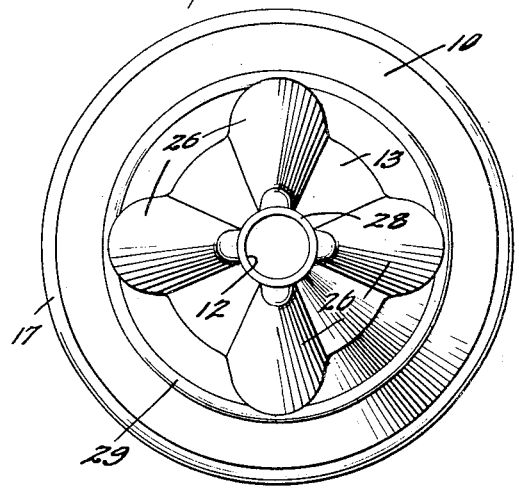

UNITED STATES PATENT OFFICE 1,930,396

VACUUM WASHER

Austin John Ruppert, Forreston, Ill.

Application October 29, 1931. Serial No. 571,923

2 Claims. (Cl. 259—140)

My invention relates to vacuum washers of the type known as stompers.

One of the objects is to form the parts from single pieces of flat metal stock so that they can be produced cheaply, and then suitably joined together so as to make a device that will be simple in construction and efficient in use.

The invention also consists in certain novel and peculiar features of construction and combination of parts as will be hereinafter more fully described and particularly set forth in the claims.

Referring to the drawing for a more complete disclosure of the invention

Fig. 1 is a vertical section,

Fig. 2 is a bottom plan view, and

Fig. 3 is a top plan view.

The body 10 of the washer is made in the regulation shape of a funnel or frustum of a cone and is provided with an opening 11 in the top through which the handle tube 12 protrudes and over which a cap or cover 13 is placed.

The body 10 is provided with a plain lower edge 14 while at the top, there is provided a plurality of round holes 15.

The lower member 16, which is the bottom enclosure or the agitator, is stamped or drawn out of one single piece of suitable material and provided with a curled rim 17 which fits over the lower edge 14 of the body and into which a coil of wire 18 is placed, the body and bottom enclosure being thereby wired together by a curling machine or rolling process.

The outer flat edge 19 of the bottom is provided with a series of round holes 20 while the curved or rounded part 21 is provided with a series of round holes 22. The center of the bottom plate is provided with a large hole 23, that has a flange 24, through which the handle tube 12 extends, the tube being provided with a flange 25, the two flanges being rolled or curled into one section or piece at this point.

At the top of the body, through which the handle tube extends, the tube, cap and body will be soldered together.

The cap 13 is provided with a series of ears 26 having openings 27 and is formed from a flat blank.

The top of the tube 12 will be folded over at 28 to provide a smooth edge or top.

The body may be beaded at 29 for stiffening.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Therefore what I claim as new and desire to secure by Letters Patent is:

1. A vacuum washer comprising a funnel shaped body, a bottom plate connected to the lower edge of the said body having a flat edge portion and a curved central portion and a series of apertures in the said bottom plate.

2. A vacuum washer consisting of a funnel shaped body having an opening in the top, a handle tube protruding through the opening, a bottom plate, free from projections, and having a flat edge portion and a curved central portion and a series of apertures in the said portions, the said plate being connected to the lower edge of said body and the lower end of the handle tube.

AUSTIN JOHN RUPPERT.